US011072278B2

(12) United States Patent
Hibino (10) Patent No.: US 11,072,278 B2
(45) Date of Patent: Jul. 27, 2021

(54) MOVING-BODY INDOOR ILLUMINATION APPARATUS AND MOVING BODY

(71) Applicant: PANASONIC INTELLECTUAL PROPERTY MANAGEMENT CO., LTD., Osaka (JP)

(72) Inventor: Kota Hibino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/577,798

(22) Filed: Sep. 20, 2019

(65) Prior Publication Data

US 2020/0101894 A1 Apr. 2, 2020

(30) Foreign Application Priority Data

Sep. 27, 2018 (JP) .............................. JP2018-182779
Sep. 27, 2018 (JP) .............................. JP2018-182821

(51) Int. Cl.
*B60Q 3/44* (2017.01)
*B64D 11/00* (2006.01)
*B60Q 3/76* (2017.01)

(52) U.S. Cl.
CPC ................. *B60Q 3/44* (2017.02); *B60Q 3/76* (2017.02); *B64D 11/00* (2013.01); *B64D 2011/0053* (2013.01)

(58) Field of Classification Search
CPC ............. B60Q 3/44; B60Q 3/76; B64D 11/00
See application file for complete search history.

(56) References Cited

U.S. PATENT DOCUMENTS

2007/0297182 A1* 12/2007 Stache ..................... B60Q 3/76
362/362
2009/0262538 A1* 10/2009 Ono ......................... B60Q 3/44
362/269

FOREIGN PATENT DOCUMENTS

JP 2009-274712 11/2009

* cited by examiner

*Primary Examiner* — Rajarshi Chakraborty
*Assistant Examiner* — Nathaniel J Lee
(74) *Attorney, Agent, or Firm* — Greenblum & Bernstein, P.L.C.

(57) ABSTRACT

A moving-body indoor illumination apparatus is provided. The moving-body indoor illumination apparatus includes a light source, and a holder for holding the light source. The light source is pressed against the holder. The light source includes a spherical housing and a light emitter. The light emitter is disposed within the housing. The housing is provided with a housing-side restricting part that restricts movement of the housing with respect to the holder by contacting with or approaching the holder in a portion different from a portion which is exposed from an opening on an irradiation side of the holder.

6 Claims, 9 Drawing Sheets

MOVING-BODY INDOOR ILLUMINATION APPARATUS AND MOVING BODY

CROSS REFERENCE TO RELATED APPLICATION

The entire disclosure of Japanese Patent Application Nos. 2018-182821 and 2018-182779 filed on Sep. 27, 2018, including the specification, claims, drawings, and abstract is incorporated herein by reference in its entirety.

TECHNICAL FIELD

The present disclosure relates to a moving-body indoor illumination apparatus and a moving body.

BACKGROUND

Conventionally, as a moving-body indoor illumination apparatus to be installed near a seat of a railway vehicle and an aircraft, etc., there is a known configuration in which a spherical housing of a light source unit is held in a metallic holder, and a short cylinder part is provided in a part of the housing, which protrudes from a circular opening of the holder. A lens part of the light source unit is disposed inside the short cylinder part. A plurality of grooves are formed on an outer surface of the housing, a plurality of projections are formed in an inner surface of the holder, and the projections are received by the grooves so that the housing is made pivotable within a predetermined range. An outer peripheral surface of a tip part of the short cylinder part acts as a stopper to restrict the rotation of the housing by abutting against the inner peripheral surface of the circular opening of the holder.

A reading light (moving-body indoor illumination apparatus) is described in Japanese Unexamined Patent Application No. 2009-274712. In this reading light, a lamp (light source unit) internally having a light source is disposed inside an appliance body having a pair of circular-arc walls, and a protrusion protruding from a lamp body is inserted into a gap between the circular-arc walls thereby tolerating a small amount of rotation of the lamp with respect to the appliance body. Moreover, by causing the outer surface of the cylindrical part protruding toward a front side, which is an irradiation side, of the lamp body to come into contact with the inner peripheral part of a restriction ring, rotation of the lamp is restricted, thereby restricting a moving range of the lamp in the irradiation direction. Moreover, a back surface of the lamp body includes a part of a spherical surface, and the back surface is pressed by a plate spring.

In the above described conventional configuration of a moving-body indoor illumination apparatus, since a projection of the holder is received by a groove of the housing, the groove extends to a front side of the housing. As a result, on the front side of the housing, the groove appears in a portion exposed from the opening of the holder, thus impairing appearance quality. Moreover, it is not possible to insert and assemble the housing having a groove inside the holder in a state in which a projection is protruding from the inner surface of the holder. For this reason, the housing needs to be assembled by inserting a shaft into the housing from the outside of the holder after inserting the housing into the holder without a shaft part, and therefore the assembling work is difficult. In the case of the configuration according to Japanese Unexamined Patent Application No. 2009-274712, since the rotation of the light source unit is restricted by bringing the outer surface of a cylindrical part protruding to the front side of the lamp body into contact with the inner peripheral part of a restriction ring, inconveniences occur such as coat peeling that occurs on the outer surface of the front side of the light source unit. For this reason, it is desired to restrict the pivoting at a portion other than the portion exposed from the front of the light source unit.

Moreover, in a previously known illumination apparatus in which a spherical housing is held in a holder, to make a short cylinder part of the housing work as a stopper to abut against an opening of the holder, a corner part (edge) is formed at a tip of the short cylinder part. Because of this, a user may feel pain when touching the tip of the short cylinder part. Therefore, it is desirable to remove the corner part of the short cylinder part. Moreover, to give a high quality impression in an installed state of the illumination apparatus, it is conceivable to apply coating on the outer surface of the housing, which is exposed through the opening of the holder. However, coat peeling may occur as a result of the short cylinder part abutting against the holder. For this reason, coating is not applied to the outer surface of the housing. In the illumination apparatus according to JP2009-274712 as well, an inconvenience similar to that described above may occur.

As described above, in a previously known illumination apparatus in which a spherical housing is held in a holder, or in a configuration according to Japanese Unexamined Patent Application No. 2009-274712, a stopper which restricts the movement of a light source unit is provided in a portion of the light source unit which is exposed from an opening of the holder. For this reason, it is desirable to prevent inconveniences caused by the stopper.

SUMMARY

A moving-body indoor illumination apparatus which is an aspect of the present disclosure is a moving-body indoor illumination apparatus, including: a light source; and a holder for holding the light source, wherein the light source is pressed against the holder, the light source includes a spherical housing and a light emitter, the light emitter being disposed within the housing, and the housing is provided with a housing-side restricting part that restricts movement of the housing with respect to the holder by contacting with or approaching the holder in a portion different from a portion which is exposed from an opening on an irradiation side of the holder.

A moving body which is an aspect of the present disclosure is moving body including a moving-body indoor illumination apparatus according to the present disclosure, wherein the moving-body indoor illumination apparatus is disposed above a seat.

Advantageous Effects of Invention

According to a moving-body illumination apparatus and a moving body, which are an aspect of the present disclosure, since the housing is provided with a housing-side restricting part that restricts movement of the housing by contacting with or approaching the holder in a portion different from a portion which is exposed from an opening of an irradiation side of the holder, there is no need to provide a stopper for restricting movement of the housing in a portion of the housing which is exposed from the opening of the holder. This enables prevention of inconveniences caused by the stopper.

BRIEF DESCRIPTION OF DRAWINGS

The figures depict one or more implementations in accordance with the present teaching, by way of example only, not by way of limitations.
In the figures, like reference numerals refer to the same or similar elements.
An embodiment of the present disclosure will be described based on the following figures, wherein.

DESCRIPTION OF EMBODIMENT

Hereinafter, an exemplary embodiment of the moving-body indoor illumination apparatus according to the present disclosure will be described in detail with reference to the drawings. Since the drawings referenced in the description of embodiment are schematic illustrations, dimensional ratios and the like of each component should be judged in consideration of the following description. In the following description, concrete shapes, materials, quantities etc. are exemplifications to facilitate the understanding of the present disclosure, and can be appropriately modified in accordance with specifications of illumination apparatus. Hereinafter, description will be given in such a way that like elements are assigned like reference symbols throughout all the drawings.

Figure 1:
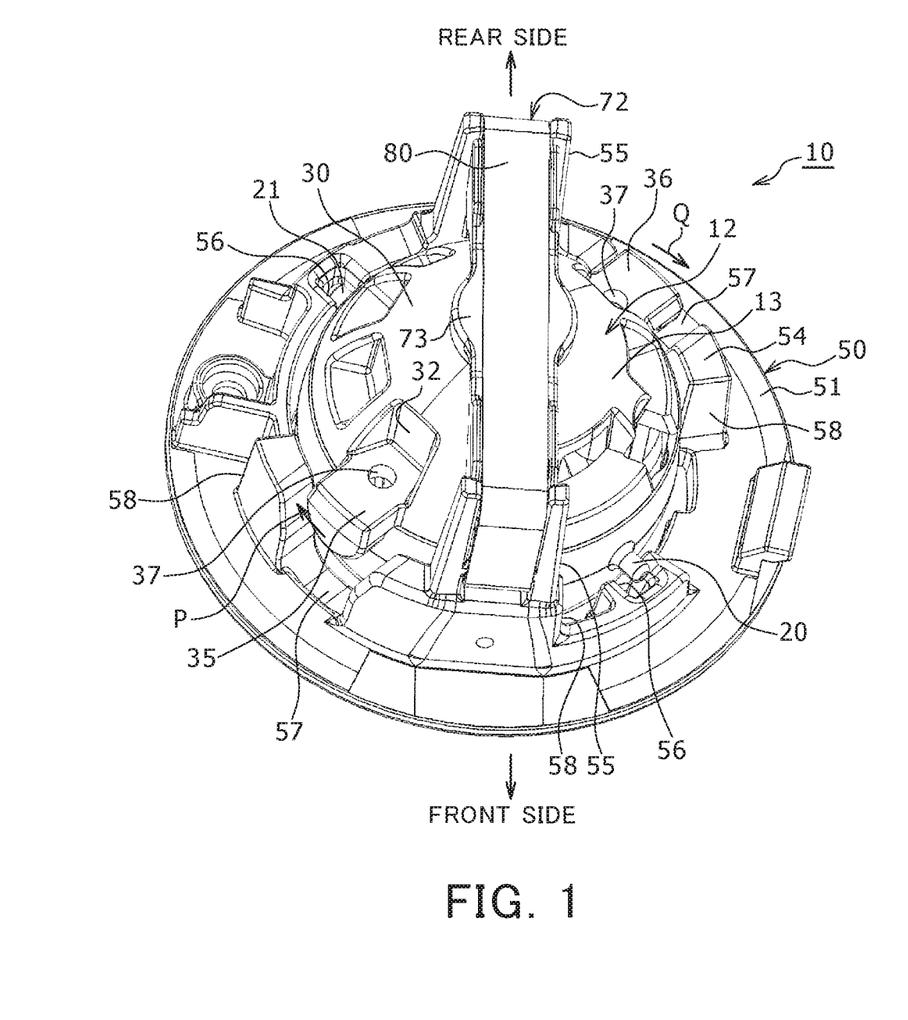
FIG. 1 is a perspective view of a moving-body indoor illumination apparatus of an exemplary embodiment as seen from a rear side opposite to a light emitting direction.
Figure 2:
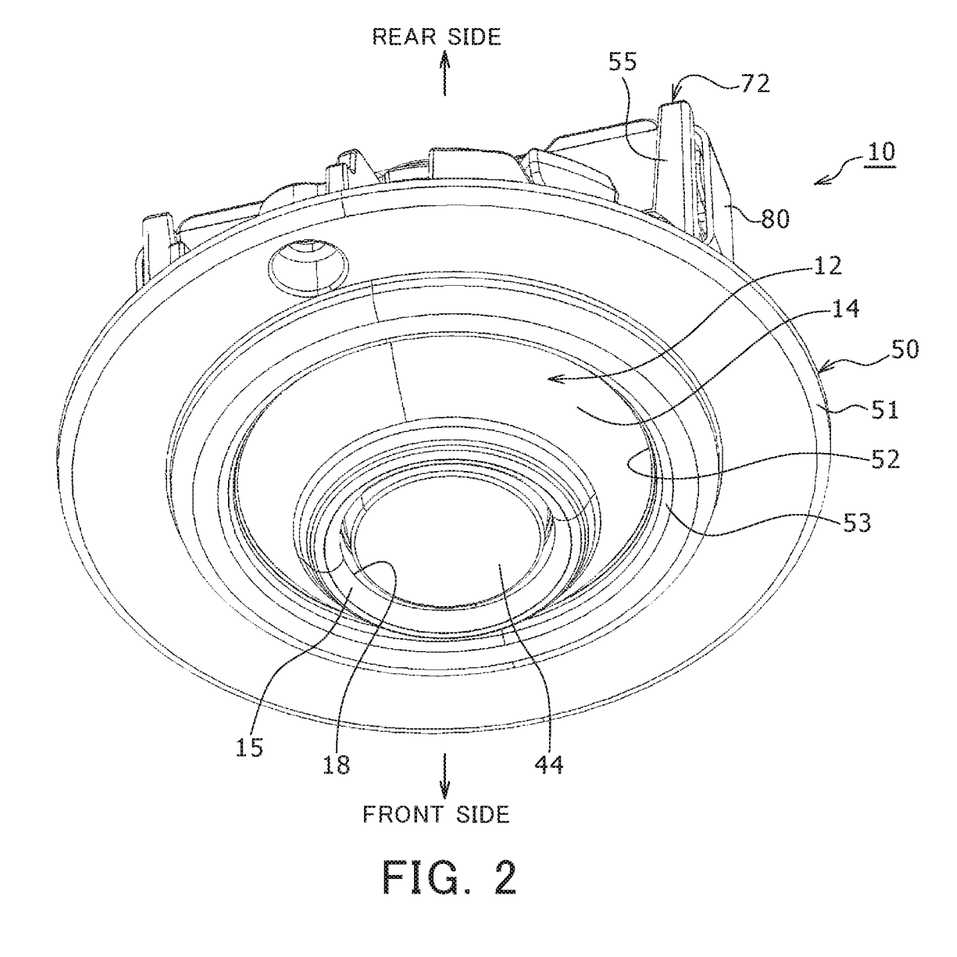
FIG. 2 is a perspective view of a moving-body indoor illumination apparatus of an exemplary embodiment as seen from a front side which is the light emitting direction.
Figure 3:
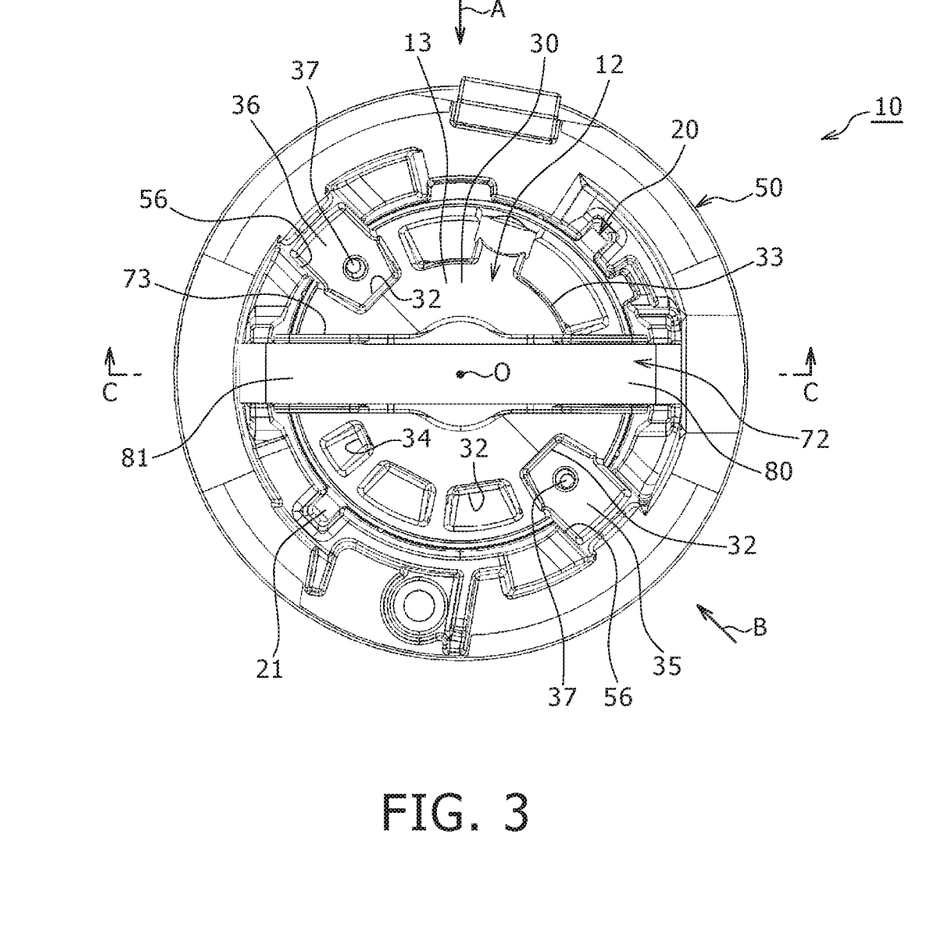
FIG. 3 is a diagram of a moving-body indoor illumination apparatus of an exemplary embodiment as seen from the rear side.
Figure 4:
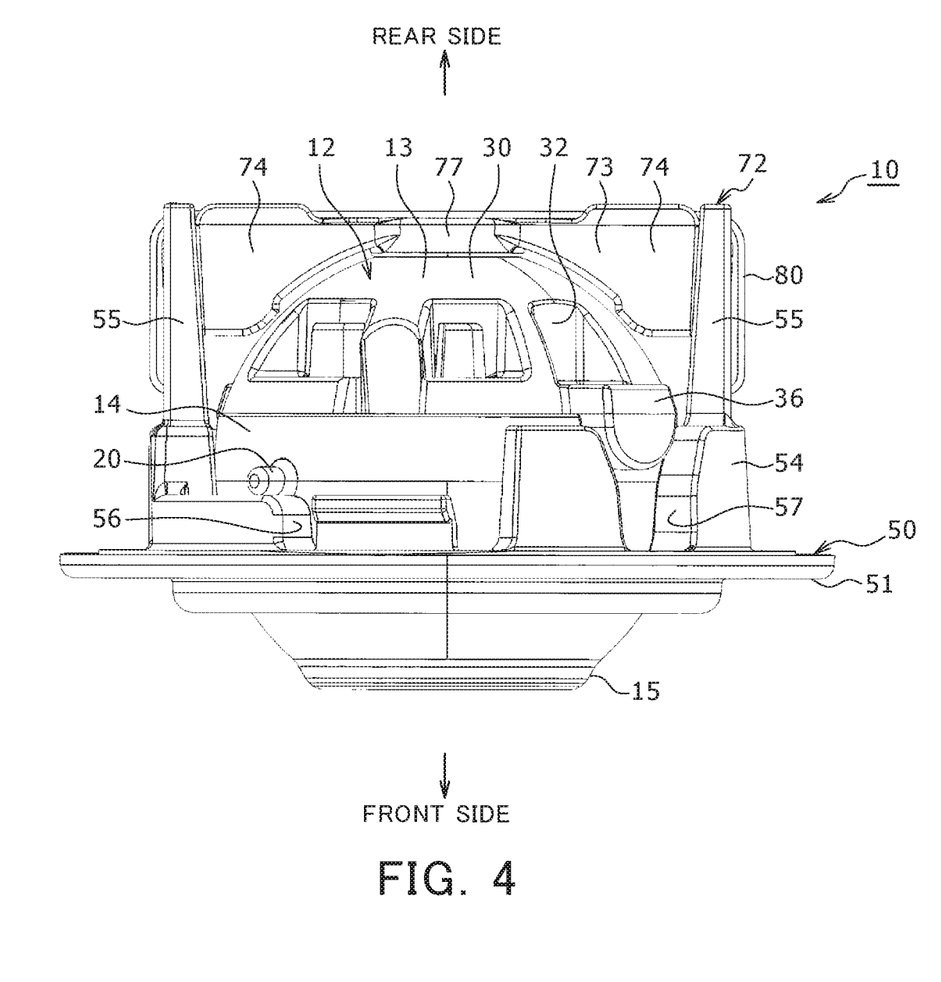
FIG. 4 is a diagram as seen from arrow A in FIG. 3.
Figure 5:
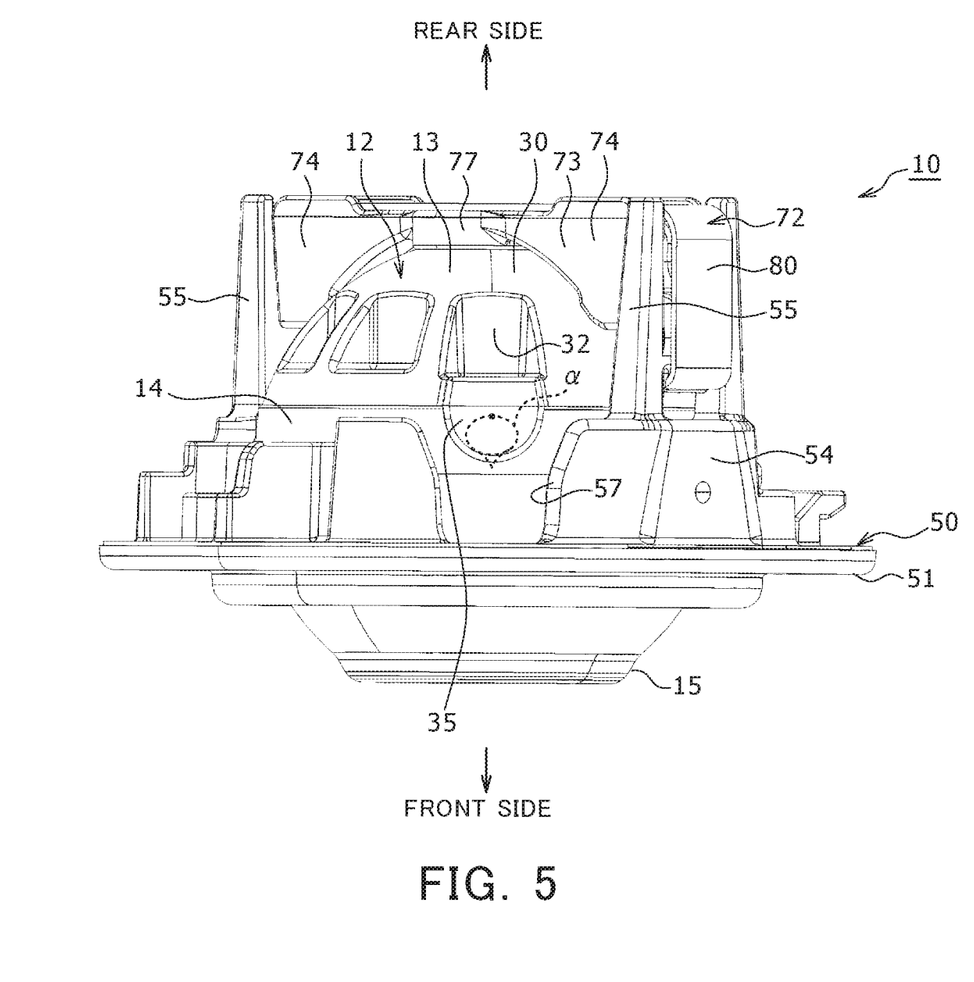
FIG. 5 is a diagram as seen from arrow B in FIG. 3.
Figure 6:
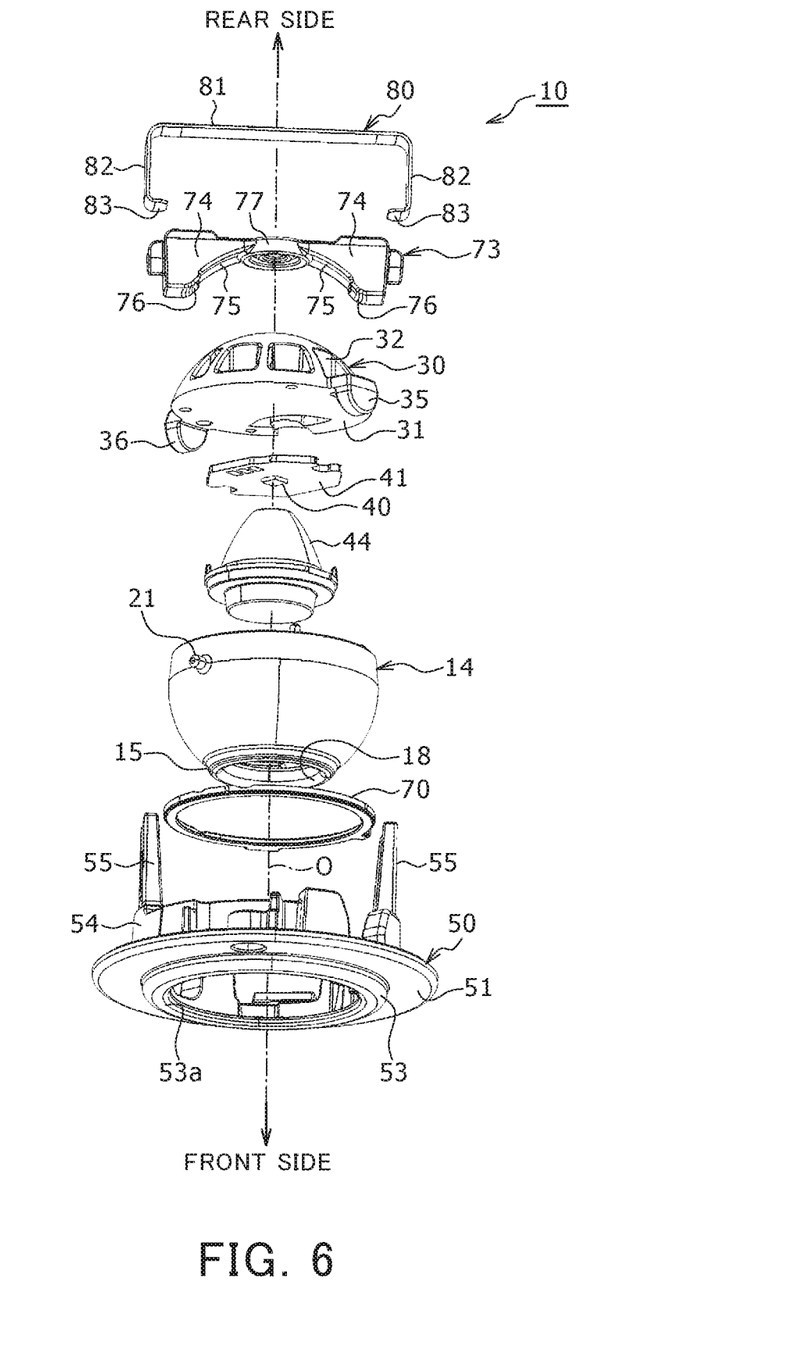
FIG. 6 is an exploded perspective view of a moving-body indoor illumination apparatus of an exemplary embodiment as seen from the front side.
Figure 7:
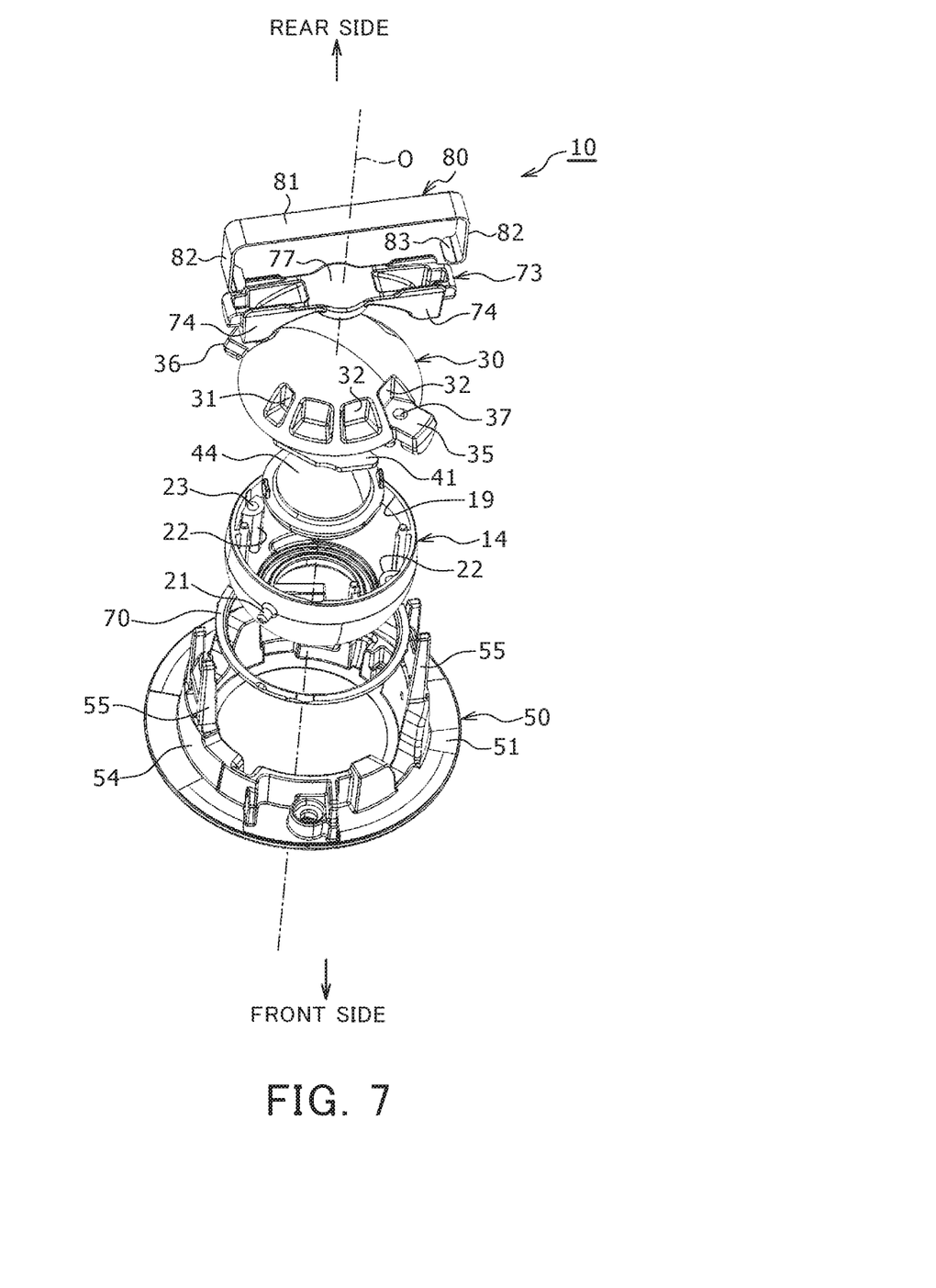
FIG. 7 is an exploded perspective view of a moving-body indoor illumination apparatus of an exemplary embodiment as seen from the rear side.
Figure 8:
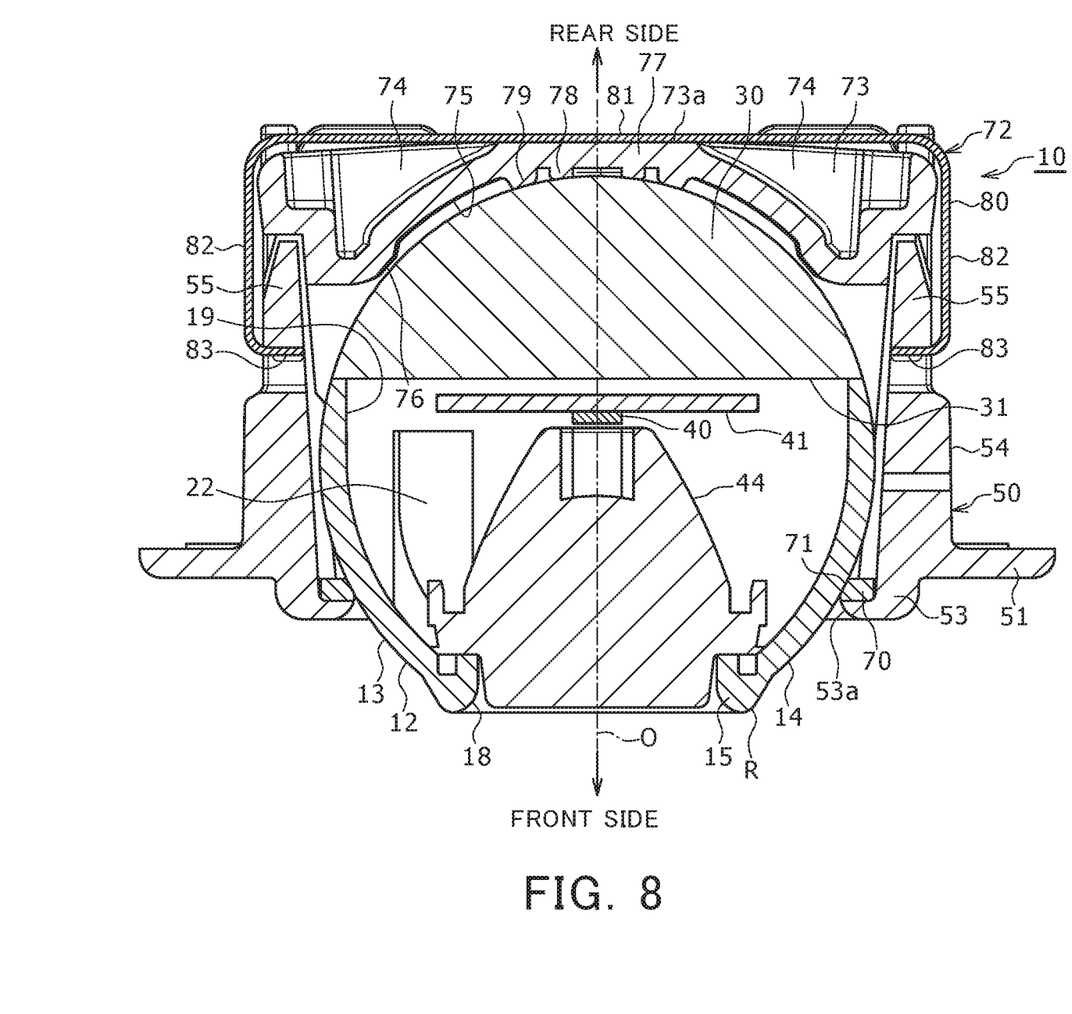
FIG. 8 is a C-C cross sectional view of FIG. 3.

FIG. 1 is a perspective view of a moving-body indoor illumination apparatus 10 of an exemplary embodiment as seen from a rear side opposite to a light emitting direction. FIG. 2 is a perspective view of the moving-body indoor illumination apparatus 10 as seen from a front side which is a light emitting direction. FIG. 3 is a diagram of the moving-body indoor illumination apparatus 10 as seen from a rear side. FIG. 4 is a diagram as seen from arrow A in FIG. 3. FIG. 5 is a diagram as seen from arrow B in FIG. 3. FIG. 6 is an exploded perspective view of the moving-body indoor illumination apparatus 10 as seen from the front side. FIG. 7 is an exploded perspective view of the moving-body indoor illumination apparatus 10 as seen from the rear side. FIG. 8 is a C-C cross sectional view of FIG. 3. Hereinafter, the moving-body indoor illumination apparatus 10 will be denoted as an illumination apparatus 10.

As shown in FIGS. 1 to 8, the illumination apparatus 10 includes a light source unit 12, a holder 50, a sliding ring 70 (FIGS. 6 to 8), and a pressing part 72. The light source unit 12 corresponds to the light source.

The illumination apparatus 10 is disposed near a seat 91 (FIG. 9) of an aircraft 90 (FIG. 9) which is a moving body. Specifically, it is fitted by being embedded in a fitting hole provided within reach of a user, who is sitting in the seat 91, above the seat 91 for a passenger in the aircraft 90, and radiates light downward. This will be described later using FIG. 9. In this description, for the sake of convenience of explanation, the light emitting side of the illumination apparatus 10 is denoted as a "front side" and the opposite side thereof as a "rear side" in a state in which the illumination apparatus 10 is fitted.

The light source unit 12 is configured to include a substantially spherical housing 13, a light emitter 40 (FIGS. 6 and 8), and a lens 44 (FIG. 2). The housing 13 is formed by coupling the cover 14 on the front side (lower side of FIGS. 4 and 5) with a light source body 30 on the rear side (upper side of FIGS. 4 and 5). As shown in FIGS. 6 to 8, the cover 14 has a semispherical inner surface and outer surface, and includes a short cylinder part 15 protruding to the front side. The cover 14 is formed of, for example, a resin, etc. which has light weight and excellent heat resistance.

A circular opening 18 is formed at a tip, which is a front side end, of the short cylinder part 15. An opening 19 is also formed at a rear side end of the cover 14. A pair of shaft parts 20, 21 which protrude in a direction orthogonal to a center axis O are formed and disposed at two positions which are 180 degrees out of phase with each other in an outer peripheral surface of a rear side end of the cover 14. The shaft parts 20, 21 correspond to first housing-side restricting parts. Each of the shaft parts 20, 21 has a column shape of substantially the same size. The pair of shaft parts 20, 21 are used to restrict a moving range of the housing 13 with respect to a holder 50 to be described below. The pair of shaft parts 20, 21 are disposed in a portion different from a portion, in the housing 13, which is exposed from an opening on the irradiation side of the holder 50. A plurality of fitting projections 22 (FIG. 7) are formed in the inner surface of the cover 14, and a screw hole 23 (FIG. 7) which is in a direction parallel with the center axis O is formed in each fitting projection 22.

As shown in FIGS. 6 to 8, the light source body 30 is formed into a semispherical shape, and has a planar part 31 lying along a plane orthogonal to the center axis O in a most portion of the front side end. Grooves 32, 33, 34 are formed at a plurality of positions in a circumferential direction of the outer peripheral surface of the front-side end part of the light source body 30. Two projections 35, 36 which protrude in a direction orthogonal to the center axis O are formed and disposed at two positions which are 180 degrees out of phase with each other in an outer peripheral surface of the front-side end part of the light source body 30. The two projections 35, 36 are substantially the same in size. The rear side surfaces of the two projections 35, 36 are continuous in a planar shape from the front side surfaces of the two grooves 32. The tip part of each projection 35, 36 protrudes to the front side further than the planar part 31 at the front side end. The outer shape of at least the front side of the tip part, that is, on the side of the holder 50 to be described below, of each projection 35, 36 has a cylindrical curved shape. Each projection 35, 36 is substantially located on a great circle whose distance from the center is largest in a spherical surface portion constituted by the outer surfaces of the light source body 30 and the cover 14. The two projections 35, 36 are disposed in a portion, which is different from the portion exposed from the opening of the irradiation side of the holder 50, in the housing 13. The projections 35, 36 correspond to a second housing-side restricting part. As with the shaft parts 20, 21 of the cover 14, the two projections 35, 36 are used to restrict the moving range of the housing 13 with respect to the holder 50 to be described below. The light source body 30 is formed by casting of, for example, metal, and preferably aluminum or other alloys which are lighter than iron.

A hole 37 which penetrates through in a direction parallel with the center axis O is formed in the front-side end surface of at least a part of the groove 32 of the plurality of grooves 32, 33, 34 of the light source body 30. A bolt (not shown) that penetrates the hole 37 is coupled to the screw hole 23 formed in the fitting projection 22 of the cover 14 shown in FIG. 7. As a result of this, the cover 14 and the light source body 30 are integrally fixed, and the outer surface of the cover 14 and the outer surface of the light source body 30 form a part of spherical surfaces whose centers correspond to each other. In this state, the two projections 35, 36 protrude from the outer surface of the housing 13. The projections 35, 36 and the shaft parts 20, 21 formed in the cover 14 are formed at positions which are out of phase with each other in the circumferential direction of the housing 13.

The light emitter 40 shown in FIGS. 6 and 8 is disposed within the housing 13. The light emitter 40 is implemented on a substrate 41. The light emitter 40 is, for example, an LED (light emitting diode) which emits white light. The substrate 41 is, for example, a ceramic substrate, a resin substrate, or a metal-base substrate, etc. A power supply part (not shown) is connected to the substrate 41 via a lead wire (not shown). An electric wire (not shown) is connected to the power supply part, and power of an alternating-current power supply is supplied via a connector connected to the electric wire. The power supply part supplies power to the light emitter 40 after converting the alternating-current power into direct current power. The substrate 41, in which the light emitter 40 is disposed on the front side, is fitted to the planar part 31 of the light source body 30 via the sheet material (not shown) of the resin sheet, etc.

The lens 44 shown in FIGS. 6 to 8 is disposed on the front side of the light emitter 40 within the housing 13. Specifically, the lens 44 is disposed at a position to cause the light emitted by the light emitter 40 to transmit and exit. The lens 44 is held at, for example, the inside of a lens holder (not shown) having a cylindrical shape, and the lens holder is fixed to the light source body 30 such as by being fitted to the front side end of the light source body 30 with a bolt.

The lead wire connected to the substrate 41 is taken out to the outside through a hole (not shown) formed in the light source body 30. The lead wire is connected to the electric wire via the power supply part, and the electric wire is connected to an external alternating-current power supply via a connector.

The holder 50 includes an annular disc part 51, and a wall part 54 extruding from an end part on the inner peripheral side of the rear side surface of the disc part 51. The holder 50 holds the light source unit 12 at its inside. A short cylinder part 53 having a substantially L-shaped cross section is formed protruding from the end part on the inner peripheral side of the front side surface of the disc part 51. The short cylinder part 53 has a circular flange 53a, which protrudes to the inner peripheral side, at the front side end. The holder 50 is formed by casting of, for example, metal such as aluminum or an alloy thereof. The holder 50 may be formed of a resin.

A sliding ring 70 is disposed on the circular flange 53a (on the rear side surface) of the short cylinder part 53 of the holder 50. The sliding ring 70 is resin sheet, and a curved surface part 71 having a circular-arc shaped cross section is formed in the inner peripheral surface. The curved surface part 71 is a shape that substantially corresponds to a spherical surface of the outer surface of the cover 14 of the light source unit 12. The curved surface part 71 has a larger diameter toward the rear side end. As a result, the curved surface part 71 receives the outer surface of the cover 14, and slidably supports the light source unit 12.

Two bridge piers 55 are formed in a protruding manner at two positions, which are 180 degrees out of phase with each other, in the rear side end of the wall part 54 of the holder 50. Each of the bridge piers 55 is formed into a substantially H-shape.

As shown in FIG. 3, a pair of grooves 56 are formed at two positions, which are 180 degrees out of phase with each other, in the inner peripheral surface of the wall part 54 of the holder 50. The rear side end of the groove 56 reaches the rear side end of the wall part 54, thereby being opened. Each of the pair of grooves 56 can receive either one of shaft parts 20, 21 protruding from the cover 14. The pair of grooves 56 are substantially the same in size. The groove 56 corresponds to a holder-side restricting part. A width in the circumferential direction of the holder 50 of the groove 56 substantially corresponds to a diameter of the shaft part 20, 21. The groove 56 has a divergent shape whose width in the circumferential direction is widened toward the rear-side opening end.

Two recesses 57 are formed at two positions, which are 180 degrees out of phase with each other, of the wall part 54 of the holder 50. The rear side end of the recess 57 reaches the rear side end of the wall part 54, thereby being opened. The two recesses 57 can receive either one of the projections 35, 36 protruding from the light source body 30. The two recesses 57 are substantially the same in size. A width in the circumferential direction of the holder 50 of the each recess 57 substantially corresponds to a width in the circumferential direction of the projection 35, 36. The each recess 57 has a divergent shape whose width in the circumferential direction is widened toward the rear-side opening end.

As a result of a step surface 58 being formed between the rear side end of the recess 57 side and the rear side end of the groove 56 side, the wall part 54 is configured such that a portion where the recess 57 is disposed is larger in height than a portion where the groove 56 is disposed.

A pressing part 72 is formed by coupling a resin structure 73 and a plate spring 80 to each other. As shown in FIG. 4, the resin structure 73 is formed by integrating two end-load receiving parts 74 which are apart from each other, and a middle-load receiving part 77 which links the two end-load receiving parts 74. As shown in FIGS. 6 and 8, the front side surface of the end-load receiving part 74 has a curved surface part 75 which substantially corresponds to an outer shape of a spherical surface part of the light source body 30 in the light source unit 12. A protruding part 76 which protrudes to the side of the light source unit 12 which is disposed further inside the curved surface part 75 is formed at an outer end part of the front side surface of the end-load receiving part 74. As a result of this, the thickness of the resin structure 73 when the resin structure 73 is seen from the outside is smaller in the middle part, and gradually increases toward both ends. Double-layered cylindrical parts 78, 79 whose center axes coincide are formed on the front side surface of the middle-load receiving part 77. The cylindrical parts 78, 79 correspond to annular ribs, respectively. The tip surface of the cylindrical part 78, 79 is positioned on a spherical surface which substantially corresponds to the outer shape of the spherical surface part of the light source body 30. This makes it easy to maintain a pivot center of the light source body 30 at a middle point of the spherical surface part. A groove 73a for engaging a plate spring 80 is formed on the rear side of the resin structure 73. The resin structure 73 is formed of, for example, a resin such as polyacetal (POM), etc.

The plate spring 80, which has a substantially C-shape cross section, includes a long-size body plate part 81, and two end plate parts 82 which are bent at substantially a right angle toward the front side from both longitudinal ends of the body plate part 81. At the tips of the two end plate parts 82, engaging parts 83 are formed by being bent at substantially a right angle in a mutually approaching direction. The plate spring 80 is integrated in a state of being engaged in the groove 73a of the resin structure 73, and fitted to the two bridge piers 55 in such a way that the two bridge piers 55 of the holder 50 are interposed from the outside by the two end plate parts 82 of the plate spring 80. In this state, the engaging part 83 is engaged with an intermediate part of the bridge pier 55. The rear side end of the light source body 30 is pressed against the tip of the each cylindrical part 78, 79 of the middle-load receiving part 77 of the resin structure 73. Therefore, the light source unit 12 is pressed against the tip of the cylindrical part 78, 79 of the pressing part 72 and a sliding ring 70, and is pivotably held while sliding. As a result of this, the pressing part 72 presses the light source unit 12 against the holder 50. Moreover, since the front-side end part of the light source unit 12 protrudes from an opening of the front side end of the holder 50, and a user can touch the protruded portion with their hand to cause the light source unit 12 to pivot, it is possible to arbitrarily change orientation of the optical axis of the light source unit 12. Further, as shown in FIG. 8, a gap is formed in a normal state between the protruding part 76 of the end-load receiving part 74 of the resin structure 73 and the outer surface of the light source body 30. When a user presses the light source unit 12 to the rear side with their hand, this gap is removed and thus the light source body 30 is pressed against the protruding part 76, thereby allowing the end-load receiving part 74 to change force from the light source body 30 into force in a direction inclined with respect to the center axis O. In this situation, the end-load receiving part 74 is pressed against the wall part 54 in a direction to widen the spacing between the two bridge piers 55. As a result of this, it becomes easier to receive force from the light source body 30 by the wall part 54 which has higher strength, thereby obviating the need to excessively increase the thickness of the rear-side end part, which is subject to force in a direction of the center axis O, of the pressing part 72. This makes it possible to prevent excessive increase in the size of the outer shape of the illumination apparatus 10, while achieving high strength of the illumination apparatus 10.

Figure 9:
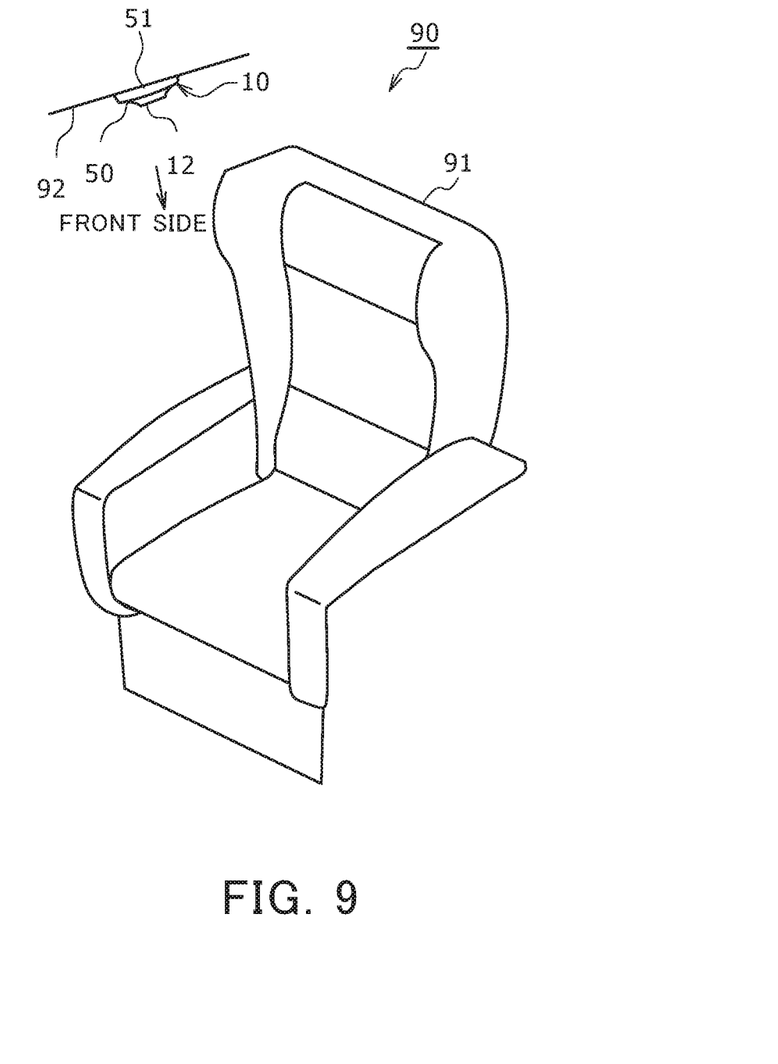
FIG. 9 is a diagram to show relation between a seat and a moving-body indoor illumination apparatus in a moving body of an exemplary embodiment.

Such illumination apparatus 10 is fitted to a fitting plate part 92 by being pressed into a fitting hole (not shown) of the fitting plate part 92, which is disposed above a seat 91 of an aircraft 90, with the plate spring 80 (FIG. 1) side being on the front side, as shown in FIG. 9. In this situation, the disc part 51 of the holder 50 is exposed on the front side of the fitting plate part 92, and the illumination apparatus 10 is fitted to the fitting plate part 92 with a coupling member (not shown) such as a clip, and a screw, etc. which penetrates the disc part 51 and the fitting plate part 92.

In this state, the configuration is such that when one projection 35 of the two projections 35, 36 formed in the light source unit 12 approaches one recess 57 of the two recesses 57 formed in the holder 50, the other projection 36 moves away from the other recess 57. For example, when the projection 35 approaches the recess 57 in a direction indicated by arrow P in FIG. 1, the projection 36 moves away from the recess 57 in a direction indicated by arrow Q in FIG. 1. Contrary to this, the configuration is also such that when one projection 36 approaches one recess 57 of the two recesses 57, the other projection 35 moves away from the other recess 57. Further, the pivot range of the housing 13 with respect to the holder 50 is set so as to include a state in which when the housing 13 is pivoted with respect to the holder 50, although one shaft part 20 (or 21) of the pair of shaft parts 20, 21 is detached from the groove 56, the other shaft part 21 (or 20) is being received in the groove 56. As a result of this, as shown by a moving trajectory (dotted line a) of one projection in FIG. 5, movement of the projections 35, 36 is restricted by contact between the projection 35, 36 and the recess 57, or the shaft part 20, 21 and the groove 56 such that each projection 35, 36 only moves along the shape of the upper half of a figure of eight shape. As a result of that the movement of the projection 35, 36 is restricted on the spherical surface in this way, and it is possible to arbitrarily and smoothly move the portion of the light source unit 12 which protrudes from the opening manually within a range where the front-side end part of the light source unit 12 does not come into contact with the opening-side end part of the holder 50. Moreover, the front-side end part of the light source unit 12 is prevented from coming into contact with the opening-side end part of the holder 50 by the projections 35, 36 on the rear side, the recess 57, the shaft parts 20, 21 and the groove 56. The number of the projections may three or more. In this case, when one of the projections approaches one of the recesses, at least of one of the other projections moves away from at least of one of the other recesses.

According to the above described illumination apparatus 10 and the aircraft 90 including this illumination apparatus 10, the housing 13 is provided with shaft parts 20, 21 and projections 35, 36, which restrict the movement of the housing 13 with respect to the holder 50 by contacting with or approaching the holder 50, in a portion different from a portion exposed from an opening on the irradiation side (front side) of the holder 50. This obviates the need to provide a stopper for restricting the movement of the housing 13 in a portion of the housing 13 which is exposed from the opening of the holder 50. This enables prevention of inconveniences caused by the stopper. Moreover, the pivot range of the housing 13 with respect to the holder 50 is set so as to include a state in which when the housing 13 is pivoted with respect to the holder 50, although one shaft part 20 (or 21) of the pair of shaft parts 20, 21 is detached from the groove 56, the other shaft part 21 (or 20) is being received in the groove 56. Since this enables restriction of the movement of the housing 13 by the contact between at least one shaft part 20 (or 21) of the pair of shaft parts 20, 21 and the groove 56, there is no need to provide a stopper for restricting the movement of the housing 13 in a portion of the housing 13 which is exposed from the front side opening of the holder 50. As a result of this, it is possible to restrict the pivoting of the light source unit 12 at a portion, of the light source unit 12, other than that exposed from the front side. Moreover, since a groove can be prevented from being seen in a portion exposed from the opening of the holder 50 on the front side of the housing 13, it is possible to improve appearance quality. In addition to that, since the light source unit 12 can be readily insert into the holder 50, while disposing the shaft parts 20, 21 of the light source unit 12 within the groove 56 of the holder 50, it is possible to improve ease of assembly. As a result of this, it becomes possible to restrict the pivoting of the housing 13 without causing a groove to be exposed in the appearance on the front side, and improve ease of assembly. On the other hand, a different embodiment is conceivable in which a groove is formed on the housing side, and shaft parts are formed on the holder side. However, in such a case, since the shaft part is inserted into the groove from the opening side, it is not possible to insert and assemble the housing, which has grooves, inside the holder in which shaft parts protrude from the inner surface. Therefore, it is necessary to assemble the housing by inserting the shaft into the housing from outside the holder after the housing is inserted into the holder having no shaft part, and therefore assembling work is difficult. Moreover, since the groove extends to the front side of the housing, the groove is visible in a portion exposed from the opening of the holder on the front side of the housing, thus impairing appearance quality. According to the embodiment, it is possible to prevent such inconvenience.

Moreover, since the movement of the housing 13 of the light source unit 12 can be restricted by approach between the projection 35, 36 and the recess 57, this also obviates the need to provide a stopper for restricting the movement of the housing 13 in a portion of the housing 13 which is exposed from the front side opening of the holder 50. For this reason, it is possible to obviate an edge of a portion, which is exposed from the opening of the holder 50, of the housing 13, and it also becomes possible to apply coating to the outer surface of the housing, which is exposed through the opening of the holder 50. Further, since the edge can be obviated, it is possible to form a chamfer R having a circular-arc shaped cross section on the outer peripheral surface of the front side end of the short cylinder part 53 of the housing 13 as shown in FIG. 8. As a result of this, it is possible to improve safety of a user when a user changes irradiation direction of the light source unit 12 by touching the housing 13 of the illumination apparatus 10 from the front side. Moreover, as a result of the movement of the light source unit 12 being restricted by the projection 35, 36 and the recess 57, it is also possible to improve vibration resistance. Further, when the movement of the housing 13 is restricted by only the contact between the shaft part 20, 21 and the groove 56, a large force may be applied to the shaft part 20, 21 due to the pushing force by a user. In such a case, by sharing the force of the contact between the projection 35, 36 and the recess 57, it is possible to reduce a burden on the shaft part 20, 21, thereby improving durability.

Mover, since the recess 57 has a divergent shape, it is possible to restrict the front-side end part of the housing 13 from coming into contact with the opening-side end part of the holder 50 while increasing the degree of freedom in the movement of the housing 13.

Moreover, the projection 35, 36 has an outer surface of a cylindrical curved shape on the holder 50 side, and it is possible to prevent the housing from being caught in the holder 50 while the housing 13 is moving so that smooth movement of the housing 13 can be ensured. In the above description, although description has been given for a case in which both of the first combination of a pair of shaft parts 20, 21 and a groove 56 for receiving the shaft parts 20, 21 and the second combination of projections 35, 36 and a recess 57 for receiving the projections 35, 36 are provided, only one of the first combination and the second combination may be provided.

Although description has been given for a case in which an LED is used as the light emitter in each example described above, the light emitter of the light source unit is not limited to such a configuration, and various light sources such as an LED bulb, and an incandescent bulb may be used.

Moreover, although description has been given for a case in which the moving body to which the illumination apparatus is fitted is an aircraft, the moving body may be a Shinkansen (Bullet train), a bus, etc., and the illumination apparatus may be fitted above a seat thereof.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A moving-body indoor illumination apparatus, comprising:

a light source; and a holder for holding the light source, wherein the light source is pressed against the holder, the light source includes a spherical housing and a light emitter, the light emitter being disposed within the housing, and the housing is provided with a housing-side restricting part that restricts movement of the housing with respect to the holder by contacting with or approaching the holder in a portion different from a portion which is exposed from an opening on an irradiation side of the holder, wherein, the housing includes a pair of shafts as the housing-side restricting part, the pair of shafts is capable of being received in a pair of holder-side restricting parts of the holder, a pivot range of the housing with respect to the holder is set so as to include a state in which, when the housing is pivoted with respect to the holder, a first shaft of the pair of shafts expelled out from an inside of a corresponding first one of the pair of holder-side restricting parts and a second shaft of the pair of shafts is received in a corresponding second one of the pair of holder-side restricting parts, the housing includes a pair of projections, the holder includes a pair of recesses that receive the pair of projections, when a first one of the pair of projections approaches a first one of the pair of recesses, at least a second one of the pair of projections moves away from at least a second one of the pair of recesses, the pair of shafts are disposed at positions which are 180 degrees out of phase with each other, the pair of projections are disposed at positions which are 180 degrees out of phase with each other, each of the pair of shafts and each of the pair of projections are disposed at positions which are substantially 90 degrees out of phase with respect to a view of the housing from a rear side, which is an opposite side to the irradiation side, and movement of each of the pair of projections is restricted by contact between each of the pair of projections and a corresponding one of the pair of recesses or between each of the pair of shafts and a corresponding one of the pair of holder-side restricting parts such that each of the pair of projections moves only along a ring-shaped moving trajectory.

2. The moving-body indoor illumination apparatus according to claim 1, wherein a width of each of the pair of recesses substantially corresponds to a width of each of the pair of projections.

3. The moving-body indoor illumination apparatus according to claim 1, wherein
each of the plurality of projections has an outer surface, on a holder side of the housing, that includes a cylindrical curved shape.

4. A moving body, comprising:
the moving-body indoor illumination apparatus according to claim 1, wherein
the moving-body indoor illumination apparatus is disposed above a seat.

5. A moving-body indoor illumination apparatus, comprising:
a light source; and
a holder for holding the light source, wherein
the light source is pressed against the holder,
the light source includes a spherical housing and a light emitter, the light emitter being disposed within the housing, and
the housing is provided with a housing-side restricting part that restricts movement of the housing with respect to the holder by contacting with or approaching the holder in a portion different from a portion which is exposed from an opening on an irradiation side of the holder, wherein
the housing includes a pair of shafts as the housing-side restricting part,
the pair of shafts is capable of being received in a pair of holder-side restricting parts of the holder,
a pivot range of the housing with respect to the holder is set so as to include a state in which, when the housing is pivoted with respect to the holder, a first shaft of the pair of shafts is not received in a corresponding first one of the pair of holder-side restricting parts and a second shaft of the pair of shafts is received in a corresponding second one of the pair of holder-side restricting parts,
the housing includes a plurality of projections,
the holder includes a plurality of recesses that receive the plurality of projections,
when a first one of the plurality of projections approaches a first one of the plurality of recesses, at least a second one of the plurality of projections moves away from at least a second one of the plurality of recesses, and
each of the plurality of recesses has a divergent shape whose width, in a circumferential direction of the holder, is widened toward a rear-side opening end of the holder.

6. A moving-body indoor illumination apparatus, comprising:
a light source; and
a holder for holding the light source, wherein
the light source is pressed against the holder,
the light source includes a spherical housing and a light emitter, the light emitter being disposed within the housing,
the housing is provided with a housing-side restricting part that restricts movement of the housing with respect to the holder by contacting with or approaching the holder in a portion different from a portion which is exposed from an opening on an irradiation side of the holder,
the housing includes a plurality of projections as the housing-side restricting part,
the holder includes a plurality of recesses that receives the plurality of projections,
when a first one of the plurality of projections approaches a first one of the plurality of recesses, at least a second one of the plurality of projections moves away from at least a second one of the plurality of recesses, and
each of the plurality of recesses has a divergent shape whose width, in a circumferential direction of the holder, is widened toward a rear-side opening end of the holder.

* * * * *